July 24, 1951  H. L. BOWDITCH  2,561,969

LINKAGE MECHANISM

Filed April 10, 1946

INVENTOR.
HOEL L. BOWDITCH.
BY
Blair, Curtis & Hayward
ATTORNEYS

Patented July 24, 1951

2,561,969

UNITED STATES PATENT OFFICE 2,561,969

LINKAGE MECHANISM

Hoel L. Bowditch, Sharon, Mass., assignor to The Foxboro Company, Foxboro, Mass., a corporation of Massachusetts Application April 10, 1946, Serial No. 660,978

2 Claims. (Cl. 287—89)

This invention relates to linkage mechanism and more particularly to a novel type of link so constructed as to be capable of transmitting the movement of one movable member to a second movable member with unusually high efficiency. The link of the present invention, although not limited to such applications, is especially useful when incorporated in the condition responsive system of a sensitive measuring or control instrument, for example, a recording thermometer and will be illustratively described in such an environment.

The designer of a recording instrument or automatic controller for measuring and recording and/or controlling with a high degree of precision the value of a variable condition such as temperature, pressure, and the like is confronted by something of a dilemma. On the one hand it is desirable that the condition responsive element, i. e., the temperature responsive element, be capable of producing a relatively large mechanical movement per unit small change in temperature. Such a large mechanical movement is desirable because it minimizes the effect of any lost motion that may be present in the linkage interconnecting the responsive element and the pen or other recording element of the instrument and because it reduces the necessity for multiplication of movement in this linkage and consequently reduces the inaccuracies that are normally entailed in such multiplication. Further, it is desirable that the element be made sufficiently powerful to overcome effectively the frictional and inertial resistances that tend to inhibit the ability of the responsive element to position precisely the recording element of the instrument. On the other hand when an effort is made to construct an element which is both relatively powerful and capable of producing large movements for small changes in temperature, it becomes necessary to use large, massive parts which themselves introduce inertial resistances into the measuring system. The most satisfactory resolution of these conflicting factors lies in the direction of reducing to a minimum the frictional and inertial forces that tend to oppose movement of the condition responsive element since to the extent that such resistances can be eliminated, the recording or control element can be precisely positioned with a responsive element of lower power and lighter construction. It is therefore a very important objective in the construction of such instruments to reduce to an absolute minimum the frictional resistance and inertia in the linkage interconnecting the condition responsive element and recording element of the instrument so that a responsive element of maximum sensitivity and rapidity may be used.

It is a further requirement in the construction of such instruments that the desired reduction in friction be achieved without introducing any appreciable lost motion into the linkage. Such lost motion, if present, may well introduce an error in the reading of the instrument that more than offsets the additional accuracy gained through reduction of friction. It is thus important that the various elements comprising such a linkage be so connected as to be free from "play" so that movements of the condition responsive element will be accurately and precisely transmitted to the recording element.

It is further desirable that the elements comprising such a linkage be simple in construction so that they may be made in quantity with the necessary precision and so that they may be easily manufactured within close enough tolerances to permit interchangeability of parts and if necessary, replacement.

Some of the link and lever constructions that have previously been proposed, notably the so-called pin and hole type, suffer from certain disadvantages in cases where imperfect alignment of the link and lever occurs, i. e. where the link and lever operate in different planes. Such misalignment is difficult to eliminate entirely and when it occurs the pin may bear against the side of the hole in which it is positioned in such manner as to produce objectionable binding and frictionable resistance.

It is accordingly an object of the present invention to provide a link and lever construction wherein the joint between the link and lever is substantially frictionless and at the same time substantially free from lost motion. It is another object of the invention to provide a link that may be made in small sizes and of light weight so that its inertia is small. It is still another object of the invention to provide a link that is simple in construction and can be easily manufactured in quantity within close tolerances. It is a still further object of the invention to provide a link and lever construction which minimizes the possibility of misalignment of the link and lever and minimizes the effect of any such misalignment as may occur. Other objects of the invention will be in part obvious and in part pointed out hereinafter.

The many objects and advantages of the present invention may best be appreciated by reference to the accompanying drawings, which illustrate a preferred embodiment and alternative embodiment of the present invention and wherein:

Figure 1 is a perspective view of the temperature responsive system of a recording thermometer with a link incorporating the present invention in operative position in the system. The mechanism as shown in Figure 1 is tilted upwardly somewhat in order to better show the parts. The mechanism is normally mounted in the instrument in such manner that the pen arm as well as the link and its associated levers move in vertical planes.

Figure 1:
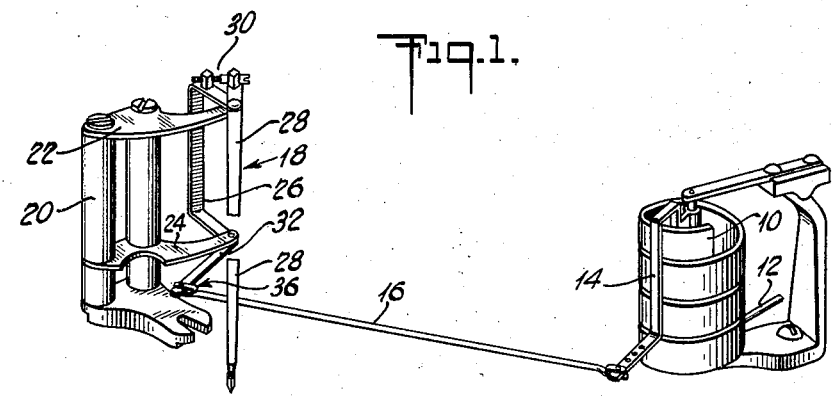

Referring to the drawings, and more particularly to Figure 1, the numeral 10 designates a conventional helical temperature responsive element which may be connected by the tube 12 with a thermometer bulb (not shown) located at the point where the temperature is to be measured. The responsive element 10 is so constructed that as the temperature rises or falls the helical element unrolls or rolls up respectively. Movement of the element 10 in response to temperature changes is transmitted by a lever 14, which is fixed to one end of the helix 10, through link 16 to an indicating and recording mechanism 18. The mechanism 18 comprises a support 20 which is commonly fixed to the casing of the instrument and which is provided with the supporting arms 22 and 24 on which a U-shaped arbor 26 is pivotally mounted. A pen arm 28 adapted to make a record of the temperature on a conventional moving chart (not shown) is affixed to the arbor 26 as indicated in the drawing and a fine threaded adjustment 30 is provided between the upper end of the pen arm and arbor 26 to permit relative adjustment of the pen and arbor. The arbor 26 has affixed thereto a lever 32 that is connected to the link 16. Thus movement of the element 10 is transmitted through lever 14, link 16, lever 32 and arbor 26 to the pen 28 and the pen is positioned in accordance with the value of the variable condition, in this case, temperature.

Figure 2:
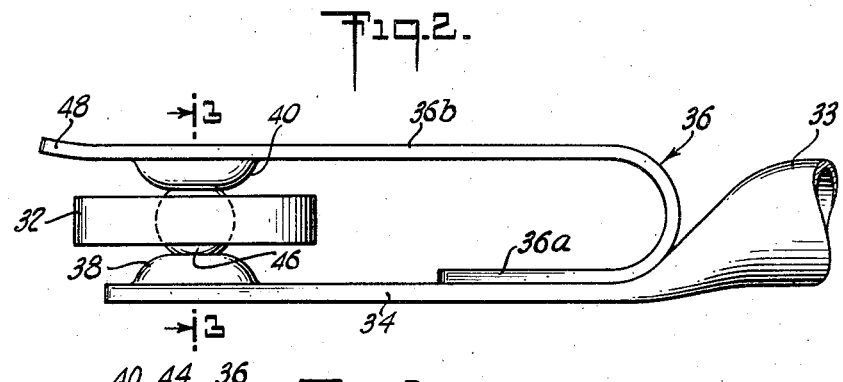
Figure 2 is a bottom plan view of one end of the link of Figure 1 showing the general relationship between the link and lever at their point of connection.

As previously pointed out, it is important that the link 16 be so constructed as to form a substantially frictionless joint with the levers 14 and 32 so that the pen arm 28 will be at all times accurately positioned by the relatively low-power element 10. Referring to Figure 2, the link 16 is preferably formed of a thin-walled tube 33, since such a tube provides the desired mechanical strength and at the same time permits the link to be relatively light in weight. The ends of the link 16 that are connected to the levers 14 and 32 may be of similar construction and hence only one end of the link is shown in Figure 2. The generally tubular link is flattened out at its end to form a strip 34 to which is affixed in any suitable manner, such as by welding, the short arm, 36a, of a substantially U-shaped strip 36. The strip 36 comprises in addition to the short arm 36a a relatively longer arm 36b that extends outwardly toward the end of the link and is normally substantially parallel to the strip 34. The strip 36 is preferably made of a resilient material so that the arm 36b and the strip 34 may be forced apart to permit insertion of the end of lever 32 in the manner described hereafter.

Figure 3:
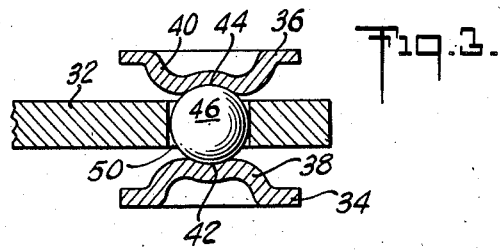
Figure 3 is a section taken on the line 3—3 of Figure 2 showing the nature of the contact between the link and lever.

Referring now of Figs. 2 and 3, the strip 34 and arm 36b have formed in their outer ends the hemispherical bosses 38 and 40 respectively, the bosses being provided with the re-entrant recesses 42 and 44 respectively. The curvature of the recesses 42 and 44 is such as to conform with the outer surface of a hardened metal sphere 46 that fits into the recesses. The sphere 46 is accurately machined and is fixed in the recess 42 in any suitable manner, such as by welding. The boss 40 of arm 36b normally bears against the sphere 46 but as pointed out above the resiliency of strip 36 is sufficient to permit the forked end of the link to be spread and thereby allow insertion of the end of a lever, such as the lever 32. As shown in Figure 2, the arm 36b extends somewhat beyond the end of strip 34 to provide a lip or overhand 48 against which pressure may be exerted when it is desired to spread the forked end of the link.

As best shown in Figure 3, the end of lever 32 is provided with a cylindrical hole 50 which is carefully machined and burnished to such a size that it accurately fits the circumference of the sphere 46, with a very small clearance, i. e. the minimum clearance that will permit the sphere to move freely in the hole 50, and hence, when the lever 32 is in its operative position with respect to the sphere 46, the only contact between the lever and link is along the equator of the sphere 46. This equator contact gives a substantially frictionless joint that may be made substantially free from lost motion. The construction is such as to permit a substantial amount of bodily movement of the sphere 46 with respect to the lever 32 along the axis of hole 50.

The thickness of lever 32 is preferably less than the diameter of the sphere 46 and greater than one half the diameter of the sphere. If the lever 32 is too thin it bcomes possible for the lever to move laterally to a point where the cylindrical wall of the hole 50 is no longer tangent to the surface of the sphere and under such conditions it is apparent that there will be lost motion between the link and lever and that the lever may become wedged between the sphere and one of the bosses thereby increasing the frictional resistance to relative movement of the lever and link. On the other hand it is desirable that the thickness of the lever be somewhat less than the distance between the bosses 38 and 40 to permit a moderate amount of misalignment of the lever and link without binding and consequent excessive friction. Even when the amount of misalignment is sufficient to cause lever 32 to come in contact with one of the bosses 38 and 40, the spherical shape of the bosses minimizes friction between the lever and link.

Figure 4:
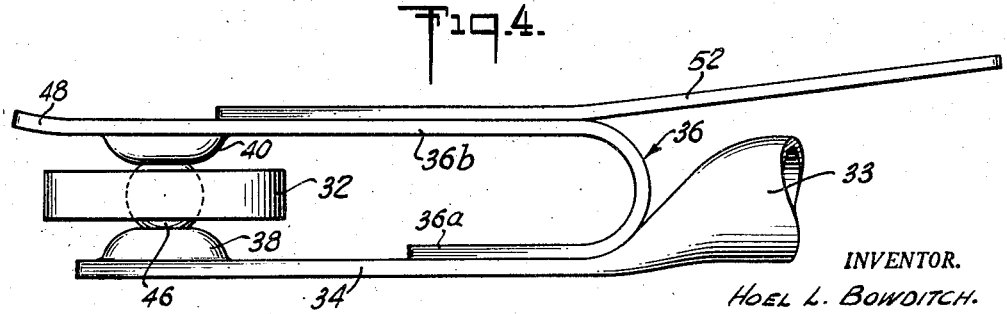
Figure 4 is a bottom plan view, similar to Figure 2, of an alternative embodiment of the present link.

Referring now to Figure 4 of the drawings there is shown an alternative construction which is essentially similar to the construction of Figures 2 and 3 but includes means for spreading the forked end of the link to permit engagement and disengagement of the lever. A depressor strip 52 is provided which is fixed at one end to the arm 36b. By depressing the inner end of the depressor strip (the right-hand end as shown in Fig. 4) the forked end of the link may be spread to such an extent as to permit insertion or removal of the lever 32. In other respects the construction of the link may be the same as that previously described in connection with Figures 2 and 3.

From the foregoing description it should be apparent that the link and lever construction of the present invention possesses many advantages not shared by the constructions previously proposed. The equator contact reduces friction to a minimum and at the same time permits substantially complete elimination of lost motion. When lateral movement of the lever with respect to the link occurs the lever bears against one of the hemispherical bosses 38 and 40 and thus excessive friction under these conditions is avoided.

Further even if slight misalignment of the lever and link occurs the equator contact is maintained and no appreciable increase in friction occurs. In cases where a combination of misalignment and lateral movement of the lever is encountered excessive friction is avoided by the hemispherical bosses which prevent rubbing contact between the lever and the main body of the link.

The structure may be easily manufactured within close tolerances and is of such a character that the parts may be made very small and of light weight to reduce their inertia. The importance of reducing inertia, particularly in the case of sensitive measuring and control instruments, has been pointed out above.

As many possible embodiments may be made of the above invention and as many changes might be made in the embodiments above set forth without departing from the scope thereof, it is to be understood that all matter hereinbefore set forth or shown in the accompanying drawings is to be interpreted as illustrative only and not in a limiting sense.

I claim:

1. A ball and cylinder universal joint construction for use in connecting small lightweight movable members such as are used in industrial recording and controlling instruments, comprising, in combination, a lever, a cylindrical opening through said lever, a link, a ball welded to said link and located in said opening in free sliding and rotating fit relation therewith for substantial bodily movement along and pivotal movement about the axis of said opening, and limiting means on said link, normally in fixed relation with said ball, arranged to make contact with the lever to limit the bodily sliding movement of said ball to prevent the center of the ball from leaving said opening, thus insuring continuous great circle contact between the ball and the cylinder, said limiting means having convexly rounded contours confronting the lever to present minimum friction-producing contact between said means and said lever.

2. A ball and cylinder universal joint construction for use in industrial recording and controlling instruments comprising, in combination, a small lightweight lever having a cylindrical opening therethrough, a small lightweight link, a ball welded to said link and located in said opening in free sliding and rotating fit relation therewith for substantial bodily movement along and pivotal movement about the axis of said opening, said ball having a diameter substantially greater than the thickness of said lever, said link having a U shaped end portion being formed of a resilient material, each leg of said end portion being provided with an inwardly facing, convexly curved boss of greater diameter than said cylindrical opening, the two bosses being aligned with each other and presenting rounded contours adapted to come in contact with said lever to limit said bodily sliding movement of said ball, each of said bosses having a central recessed portion, said ball being welded in the recessed portion of one of said bosses and thereby held between said bosses, said resilient leg removably biasing the recessed portion of the other boss against said ball, and the distance between said bosses being sufficiently greater than the thickness of said lever to allow an appreciable amount of said sliding movement of said ball axially of said opening without permitting the center of said ball to leave said opening.

HOEL L. BOWDITCH.

REFERENCES CITED

The following references are of record in the file of this patent:

UNITED STATES PATENTS

| Number | Name | Date |
| --- | --- | --- |
| 305,539 | Smith | Sept. 23, 1884 |
| 421,715 | Hopkins | Feb. 18, 1890 |
| 898,454 | Eustis | Sept. 15, 1908 |
| 916,390 | Cuno | Mar. 23, 1909 |
| 921,363 | Chrysler et al. | May 11, 1909 |
| 1,847,439 | Moulding | Mar. 1, 1932 |
| 1,906,705 | Middleton et al. | May 2, 1933 |
| 1,909,857 | Eshbaugh | May 16, 1933 |
| 2,352,347 | Scrantom | June 27, 1944 |
| 2,439,510 | Gaul | Apr. 13, 1948 |

FOREIGN PATENTS

| Number | Country | Date |
| --- | --- | --- |
| 524,550 | France | Sept. 6, 1921 |